United States Patent
Wang (10) Patent No.: US 12,222,281 B2
(45) Date of Patent: Feb. 11, 2025

(54) METHOD FOR MEASURING ELEMENT CONCENTRATION OF MATERIAL

(71) Applicant: CHANGXIN MEMORY TECHNOLOGIES, INC., Hefei (CN)

(72) Inventor: Ying-Chih Wang, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 217 days.

(21) Appl. No.: 17/814,522

(22) Filed: Jul. 24, 2022

(65) Prior Publication Data

US 2023/0111160 A1 Apr. 13, 2023

Related U.S. Application Data

(63) Continuation of application No. PCT/CN2022/076326, filed on Feb. 15, 2022.

(30) Foreign Application Priority Data

Oct. 13, 2021 (CN) ............................ 202111191461.8

(51) Int. Cl.
*G01N 21/21* (2006.01)
*G01N 21/84* (2006.01)

(52) U.S. Cl.
CPC ....... *G01N 21/211* (2013.01); *G01N 21/8422* (2013.01); *G01N 2021/8427* (2013.01); *G01N 2021/8472* (2013.01)

(58) Field of Classification Search
CPC ............. G01N 21/211; G01N 21/8422; G01N 2021/8427; G01N 2021/8472

USPC ........................................................ 356/364
See application file for complete search history.

(56) References Cited

U.S. PATENT DOCUMENTS

| | | | |
|---|---|---|---|
| 6,233,046 B1* | 5/2001 | Alba .................. | G01B 11/0641 |
| | | | 356/369 |
| 7,271,901 B2 | 9/2007 | Nabatova-Gabain | |
| 7,319,530 B1 | 1/2008 | Printy | |
| 7,349,079 B2 | 3/2008 | Zhao | |
| 7,508,531 B1 | 3/2009 | Printy | |
| 2004/0135081 A1* | 7/2004 | Larson .................... | H01J 49/14 |
| | | | 250/306 |
| 2004/0207844 A1 | 10/2004 | Nabatova-Gabain | |
| 2005/0254049 A1 | 11/2005 | Zhao | |
| 2020/0362063 A1 | 11/2020 | Tech | |

FOREIGN PATENT DOCUMENTS

| | | |
|---|---|---|
| CN | 102479730 A | 5/2012 |
| CN | 103323403 A | 9/2013 |
| CN | 108801931 A | 11/2018 |
| CN | 113281266 A | 8/2021 |

(Continued)

*Primary Examiner* — Jonathan M Hansen
(74) *Attorney, Agent, or Firm* — Syncoda LLC; Feng Ma (57) ABSTRACT

A method for measuring an element concentration of a material includes: a material sample is irradiated with first electromagnetic waves; second electromagnetic waves radiated by the material sample are obtained under the action of the first electromagnetic waves; material property parameters of the material sample are determined by detecting the second electromagnetic waves; and an element concentration of the material sample is determined according to the material property parameters.

10 Claims, 11 Drawing Sheets

(56) References Cited

FOREIGN PATENT DOCUMENTS

| | | | |
|---|---|---|---|
| JP | H1114543 | A | 1/1999 |
| JP | 2003315257 | A | 11/2003 |
| TW | 200940684 | A | 10/2009 |
| TW | I440966 | B | 6/2014 |

* cited by examiner

Equilibrium state

METHOD FOR MEASURING ELEMENT CONCENTRATION OF MATERIAL

CROSS-REFERENCE TO RELATED APPLICATIONS

This application is a continuation of International Application No. PCT/CN2022/076326 filed on Feb. 15, 2022, which claims priority to the Chinese Patent Application No. 202111191461.8 filed on Oct. 13, 2021. The disclosures of these applications are hereby incorporated by reference in their entirety.

BACKGROUND

With the development of the semiconductor manufacturing technology, large-scale integrated circuit products including memories, chips, and the like are manufactured using the semiconductor technology. Due to the high integration and high performance requirements of these products, it is often necessary to strictly control the composition of each film material during a manufacturing process. However, in a process of component measurement of a film material, the film quality will easily be affected, resulting in a deterioration of the product quality. Therefore, how to reduce effect on a film while ensuring measurement accuracy during the measurement process of various material components is a problem to be solved in material component measurement.

SUMMARY

Embodiments of the disclosure relate to the semiconductor technology, and provide a method for measuring an element concentration of a material.

In a first aspect, embodiments of the disclosure provide a method for measuring an element concentration of a material, including the following operations.

A material sample is irradiated with first electromagnetic waves.

Second electromagnetic waves radiated by the material sample are obtained under the action of the first electromagnetic waves.

Material property parameters of the material sample are determined by detecting the second electromagnetic waves.

An element concentration of the material sample is determined according to the material property parameters.

In a second aspect, embodiments of the disclosure provide another method for measuring an element concentration of a material, including the following operations.

One or more reference samples are irradiated with first electromagnetic waves, where each reference sample is a mixture of at least two substances, and the at least two substances include a substance containing an element to be measured.

Second electromagnetic waves radiated by the one or more reference samples are obtained under the action of the first electromagnetic waves.

Material property parameters of the one or more reference samples are determined by detecting the second electromagnetic waves.

A reference function according to correspondences between the material property parameters and element concentrations of the one or more reference samples is determined, where the element concentration is concentration of the element to be measured in each reference sample, and the reference function is used for determining the element concentration of the element to be measured in a sample to be measured.

DETAILED DESCRIPTION

For ease of understanding of the disclosure, the disclosure will be described more fully below with reference to the accompanying drawings. Preferred embodiments of the disclosure are shown in the drawings. However, the disclosure may be implemented in many different forms, which are not limited to the embodiments described herein. On the contrary, these embodiments are provided for making the disclosure more thorough and complete.

Unless otherwise specified, all technical and scientific terms used herein have the same meanings as commonly understood by those skilled in the technical field that the disclosure relates to. The terms used in the description of the disclosure are for the purpose of describing specific embodiments only, and are not intended to limit the disclosure. The term "and/or" used herein includes any and all combinations of one or more of associated listed items.

Figure 1:
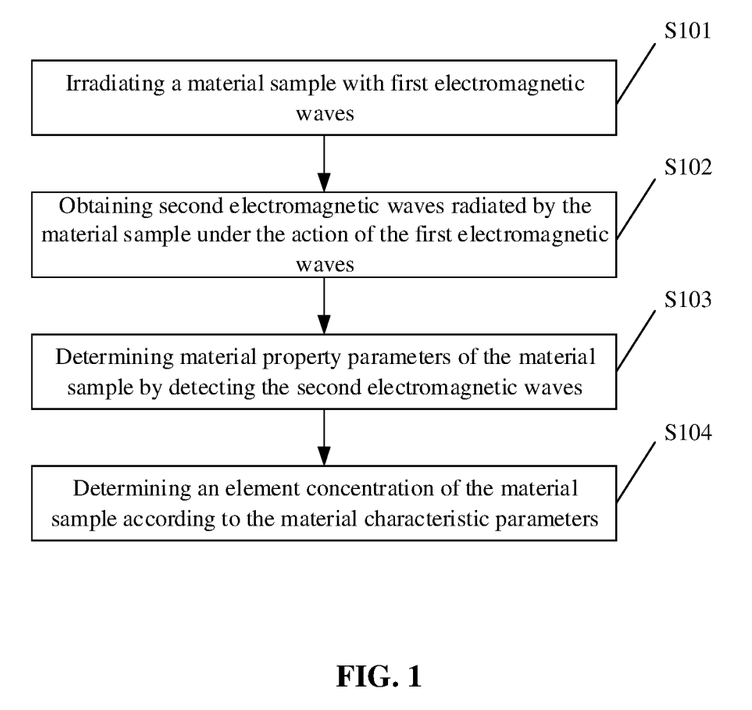
FIG. 1 is a first flowchart of a method for measuring an element concentration of a material provided in embodiments of the disclosure.

Embodiments of the disclosure provide a method for measuring an element concentration of a material. As shown in FIG. 1, the method includes the following operations.

At S101, a material sample is irradiated with first electromagnetic waves.

At S102, second electromagnetic waves radiated by the material sample are obtained under the action of the first electromagnetic waves.

At S103, material property parameters of the material sample are determined by detecting the second electromagnetic waves.

At S104, an element concentration of the material sample is determined according to the material property parameters.

In a manufacturing process of semiconductor products, various semiconductor components and circuit structures are formed by various precise processes such as film formation, doping, and etching. In this process, precise control of the thickness and composition of each film material is one of the important ways to ensure device performance.

The measurement of concentrations of impurities in some semiconductor material layers or dielectric layers is an important measurement process in the manufacturing process of semiconductor products. For example, the measurement of nitrogen doping concentration in a gate dielectric layer of a metal oxide semiconductor (MOS) transistor is one of common measurements.

Due to a high precision of semiconductor products and an extremely thin thickness of each material film, the measurement of element concentrations of material samples often affects the material film quality. For example, in the related art, high-energy rays are used to hit a material sample to cause electron radiation inside the material, and an element concentration in the material can be measured by detecting the distribution of radiated electrons. However, such method is only suitable for sampling measurement of test samples, and the material after undergoing the measurement may no longer be applicable may cause a loss of electrons within the material, resulting in a change in the film quality of the material. Moreover, the intensity of electrons emitted in this way is related to the film thickness and the concentration of a to-be-measured component. In an ultra-thin film structure, changes in properties of a film material are more likely to be caused.

Therefore, in the embodiments of the disclosure, using optical fluctuations of material elements, the material sample is irradiated with the first electromagnetic waves and the material sample radiates second electromagnetic waves under the irradiation of the first electromagnetic waves. Here, the first electromagnetic waves may be light waves, including visible light waves or infrared light waves, etc., and may also be other electromagnetic rays. The energy of the first electromagnetic waves may be low, and the first electromagnetic waves do not cause radiation of electrons in the material compared to high-energy X-rays.

In the embodiments of the disclosure, irradiation of the material sample with the first electromagnetic waves will cause fluctuations in the photoelectron of the sample, which in turn causes radiation of the second electromagnetic waves. This phenomenon can be referred to as material dispersion. The material property parameters of the material sample may include optical properties such as film thickness, refractive index, and absorptivity of the material sample. The element concentration in the material sample has a correlation with the material property parameters, and material samples with different material property parameters have different effects on the refraction of material dispersion of the first electromagnetic waves.

Therefore, by measuring property parameters of the second electromagnetic waves or changes between the second electromagnetic waves and the first electromagnetic waves, such as the wavelength of the second electromagnetic waves, or a phase difference between the second electromagnetic waves and the first electromagnetic waves, etc., the material property parameters of the material sample can be determined, and thus the element concentration of the material sample can be determined.

In one embodiment, the second electromagnetic waves can be optically measured and analyzed by an ellipsometer so as to determine the material property parameters.

With the method of the embodiments of the disclosure, the material sample can be irradiated with the first electromagnetic waves, and the second electromagnetic waves radiated by the material sample through the material dispersion can be measured, thereby determining an element concentration of the material sample. Compared with the method of using high-energy particles to impact the inside of a material and measuring electron radiation, the method of the embodiments of the disclosure can reduce the influence of the measurement process on the film quality of the material sample, and is therefore applicable to on-line measurement in large-scale production.

In some embodiments, the material sample includes: a sample to be measured and one or more reference samples; the sample to be measured is a compound containing an element to be measured, each reference sample is a mixture of at least two substances, and the at least two substances include a substance containing the element to be measured of the sample to be measured.

The operation that the element concentration in the material sample is determined according to the material property parameters includes the following operation.

The element concentration of the sample to be measured is determined according to the material property parameters of one or more reference samples and the material property parameters of the sample to be measured.

A compound material is composed of many elements, and these elements can constitute other different compounds or elemental materials. Therefore, for some compound materials, there may be a mixture of at least two substances each having an element concentration similar to that of each element in the compound material.

In the embodiments of the disclosure, for the sample to be measured, one or more reference samples each composed of a mixture of at least two substances may be used, and each reference sample may contain the element to be measured of the sample to be measured. In addition, the types of elements contained in the reference samples may be the same as the types of elements contained in the compound. In each reference sample, the element to be measured may be contained in only one substance of the reference sample, or the element to be measured may be contained in at least two substances of the reference sample.

For example, the sample to be measured is a compound material of silicon oxynitride (SiOxNy), and then a mixture material in which silicon oxide (SiOx) and silicon nitride (SiNy) are mixed can be used as a reference sample.

In the embodiments of the disclosure, the sample to be measured and the reference samples may be irradiated with the first electromagnetic waves, respectively, and the second electromagnetic waves radiated by the sample to be measured and the reference samples may be respectively measured. Since the reference samples are the mixture, the one or more reference samples can be prepared by mixing individual substances in known proportions, and content of the element to be measured in the reference samples can be determined.

By comparing the material property parameters determined by the second electromagnetic waves of the sample to be measured and the reference samples, the element concentration of the element to be measured in the sample to be measured can be determined.

In some embodiments, the method further includes the following operation.

A reference function is determined according to correspondences between the material property parameters of the one or more reference samples and the element concentrations of the one or more reference samples.

The operation that the element concentration of the sample to be measured is determined according to the material property parameters of the one or more reference samples and the material property parameters of the sample to be measured includes the following operation.

The element concentration of the sample to be measured is determined according to the reference function and the material property parameters of the sample to be measured.

Since there is a certain relationship between material property parameters and an element concentration in a sample, in the embodiments of the disclosure, reference samples in which element concentrations are known are used, and the material property parameters of the reference samples can be determined by measurement. In this way, through the measurement of the reference samples, the correspondences, i.e., the reference function, between the material property parameters and the element concentration of the element to be measured in the reference samples can be determined.

The reference function in the reference samples can also be applied to the sample to be measured. In this way, in the measurement of the sample to be measured, the element concentration in the sample to be measured can be determined by the measured material property parameters and the reference function.

In some embodiments, the operation that the reference function is determined according to correspondences between the material property parameters of the reference samples and the element concentrations in the reference samples includes the following operation.

The reference function is determined according to material property parameters and element concentrations of at least two reference samples, where the at least two reference samples have different element concentrations.

In the embodiments of the disclosure, several groups of material property parameters may be determined by measuring multiple different reference samples. These different reference samples have different element concentrations. Therefore, a reference function reflecting the material property parameters and element concentrations can be obtained by fitting the measured multiple groups of material property parameters and corresponding element concentrations.

This process can be carried out during an experiment, and after the reference function is determined, the reference function can be repeatedly applied to the measurement of the sample to be measured.

In some embodiments, the method further includes the following operation.

A proportionality coefficient of each substance in each reference sample is determined according to dielectric constants of individual substances in the reference sample and a dielectric constant of the reference sample; and The operation that the element concentration of the sample to be measured is determined according to the reference function and the material property parameters of the sample to be measured includes the following operation.

An element content of the element to be measured in the compound is determined according to the reference function, the material property parameters of the sample to be measured, and the proportionality coefficient.

For some materials, different material components in the compound and the mixture may cause differences in the material property parameters of the compound and mixture which have the same element concentrations. Therefore, functional relationships between the element concentration and the material property parameters determined by the reference samples may be different from the functional relationships between the material property parameters and the element concentration in the actual sample to be measured.

Therefore, the reference function obtained by using the reference samples in the embodiments of the disclosure needs to be corrected before being applied to the sample to be measured.

According to the mixed equilibrium effective medium theory, relationship between an element concentration and material property parameters of a material can be deduced from the dielectric constants of the material. Therefore, the proportionality coefficient of each substance in the reference sample is determined herein according to dielectric constants of individual substances mixed in the reference samples and the dielectric constant of the reference sample as a whole.

The reference function corrected by the proportionality coefficients can more accurately reflect the element content of the element to be measured in the sample to be measured.

In some embodiments, the operation that the material property parameters of the material sample are determined by detecting the second electromagnetic waves includes the following operations.

Wave parameters of the second electromagnetic waves are obtained by detecting the second electromagnetic waves.

The material property parameters of the material sample are determined according to the wave parameters.

In the embodiments of the disclosure, the detection of the second electromagnetic waves in the material sample may be implemented by measuring wave parameters. The wave parameters of the second electromagnetic waves may be parameters related to material property parameters of the material sample. That is to say, material samples having different material property parameters also have different values of corresponding wave parameters of the second electromagnetic waves. Therefore, by measuring the wave parameters of the second electromagnetic waves, the corresponding material property parameters can be determined, and then the element concentration of the element to be measured can be determined by the material property parameters.

In some embodiments, the first electromagnetic waves and the second electromagnetic waves are polarized light; and the wave parameters include ellipsometry parameters of the second electromagnetic waves.

In the embodiments of the disclosure, the material sample may be irradiated obliquely by the polarized light, i.e., the first electromagnetic waves, the incident first electromagnetic waves may be circularly polarized light, which is reflected on the surface of the material sample to form second electromagnetic waves. In this case, due to the influence of refraction and absorption of the material, the second electromagnetic waves may be elliptically polarized light. Therefore, the ellipsometry parameters of the second electromagnetic waves can be measured as wave parameters.

Here, the ellipsometry parameters may include parameters such as polarization angle of the second electromagnetic waves.

In some embodiments, the material property parameters include at least one of: film thickness, a refractive index, or an absorptivity.

In some embodiments, the material sample at least contains: oxygen, silicon, and nitrogen. The element to be measured may be nitrogen or other elements.

Figure 2:
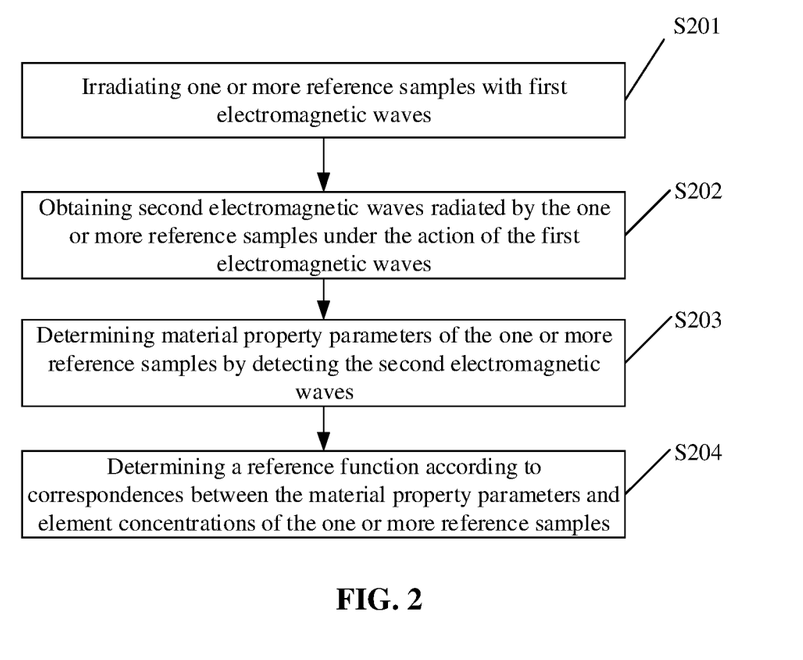
FIG. 2 is a second flowchart of a method for measuring an element concentration of a material provided in embodiments of the disclosure.

As shown in FIG. 2, embodiments of the disclosure provide another method for measuring an element concentration of a material, including the following operations.

At S201, one or more reference samples are irradiated with first electromagnetic waves, where each reference sample is a mixture of at least two substances, and the at least two substances include a substance containing an element to be measured.

At S202, second electromagnetic waves radiated by the one or more reference samples are obtained under the action of the first electromagnetic waves.

At S203, material property parameters of the one or more reference samples are determined by detecting the second electromagnetic waves.

At S204, a reference function is determined according to correspondences between the material property parameters and element concentrations of the one or more reference samples, where the element concentration is the concentration of the element to be measured in each reference sample, and the reference function is used for determining the element concentration of the element to be measured in a sample to be measured.

In the embodiments of the disclosure, the correspondences between the element concentrations of the one or more reference samples and the material property parameters corresponding to the second electromagnetic waves can be determined by irradiating the reference samples with the first electromagnetic waves.

The reference samples may have known element concentrations, and the reference function can be determined by the correspondences between the measured material property parameters and the known element concentrations. Thus, the determined reference function can be directly applied to the measurement of other material samples.

Here, the element concentration may be the concentration of one specified element in a reference sample, or may be the concentrations of multiple elements in a reference sample.

The element concentrations in the reference samples can be determined by raw materials from which the reference samples are prepared, for example, the concentration of each element in the prepared reference samples is determined according to the proportions of various compounds or elemental materials used in preparing the reference samples, the chemical formulas of various materials, etc.

In the embodiments of the disclosure, a reference sample may be a mixture of multiple materials, or may be compounds containing multiple chemical elements.

In some embodiments, the operation that the reference function is determined according to correspondences between the material property parameters and the element concentrations of the one or more reference samples includes the following operation.

The reference function is determined according to the material property parameters and the element concentrations of at least two reference samples, where the at least two reference samples have different element concentrations.

There may be multiple reference samples, and the types of elements contained in the multiple reference samples should be the same, but different reference samples have different element concentrations. Here, different element concentrations may indicate that the element concentrations of one specified element in the different reference samples are different, or may indicate that the concentrations of all elements in the different reference samples are different.

In the process of determining the reference function, the same first electromagnetic waves may be used to irradiate different reference samples separately, and corresponding second electromagnetic waves can be obtained respectively. The material property parameters corresponding to respective reference samples can be determined by detecting respective second electromagnetic waves.

By fitting multiple groups of material property parameters and the element concentrations, the functional relationship, i.e., the reference function, between the material property parameters and the element concentrations can be obtained.

In some embodiments, the first electromagnetic waves include at least two groups of electromagnetic waves having different wavelengths.

The operation that the reference function is determined according to the material property parameters and the element concentrations of at least two reference samples includes the following operations.

At least two relationship curves are determined according to the material property parameters respectively obtained according to the at least two groups of electromagnetic waves having different wavelengths and corresponding element concentrations.

A relationship curve with the largest change rate among the at least two relationship curves is determined as the reference function.

Since electromagnetic waves having different wavelengths have different absorption and reflection effects on materials, in the embodiments of the disclosure, the first electromagnetic waves may include at least two groups of electromagnetic waves having different wavelengths.

Different relationship curves can be determined by irradiating multiple reference samples with first electromagnetic waves having different wavelengths, respectively. The difference between these relationship curves is caused by the wavelengths of the first electromagnetic waves. Therefore, the relationship curve having a largest change rate can be selected as the reference function, and measurement is carried out using the first electromagnetic wave corresponding to this relationship curve in a subsequent process of measuring the sample to be measured.

Thus, the electromagnetic wave most suitable for the element concentration measurement of the material sample can be determined by design of experiment (DOE). Moreover, the reference function is also obtained from multiple experimental results, so that the most suitable reference function can be used for subsequent measurement.

In some embodiments, the operation that the material property parameters of the one or more reference samples are determined by detecting the second electromagnetic waves includes the following operations.

Wave parameters of the second electromagnetic waves are obtained by detecting the second electromagnetic waves.

The material property parameters of each reference sample are determined according to the wave parameters.

Similar to the method of determining the material property parameters of the material sample in the embodiments above, in the embodiments of the disclosure, the determination of the material property parameters of the reference samples can also be realized by detecting the second electromagnetic waves and obtaining corresponding wave parameters.

In some embodiments, the first electromagnetic waves and the second electromagnetic waves are polarized light, and the wave parameters include ellipsometry parameters of the second electromagnetic waves.

For example, the reference samples can be irradiated with circularly polarized light as the first electromagnetic waves, and the second electromagnetic waves obtained by reflection are elliptically polarized light. By detecting the ellipsometry parameters of the elliptically polarized light, the corresponding material property parameters can be determined.

Certainly, the correspondences between the ellipsometry parameters and material property parameters can also be obtained by a large number of experiments.

In some embodiments, the material property parameters include at least one of: a film thickness; a refractive index; or an absorptivity.

The embodiments of the disclosure further provide the following examples.

In the field of semiconductor product manufacturing, optical film thickness measurement and optoelectronic detection are often applied to the measurement of nitrogen concentration in ultra-thin silicon nitride.

Nitrogen concentration is an important parameter that affects device performance in structures such as gate oxide layers and isolation layers. For example, an gate oxide layer is an ultra-thin dielectric film having a thickness of about 2-5 nanometers (nm), and the thickness accuracy thereof is another key factor to effective oxide thickness (EOT) and gate performance.

Figure 3:
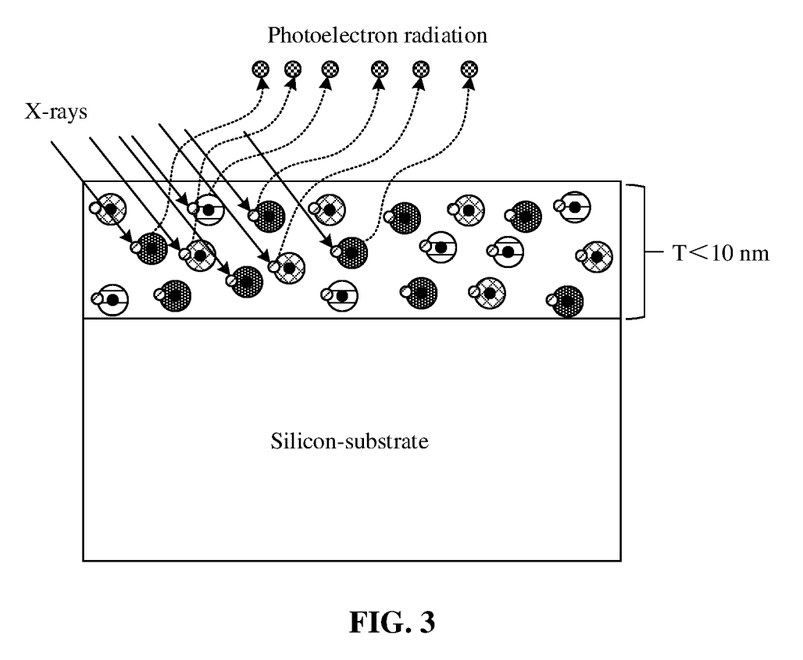
FIG. 3 is a schematic diagram of excitation of photoelectron radiation by X-rays irradiation of a material in embodiments of the disclosure.

In some embodiments, X-ray photoelectron spectroscopy is one of the means to measure nitrogen concentration in a film. As shown in FIG. 3, photoelectron radiation can be excited by X-ray irradiation of a silicon oxynitride film having a thickness of less than 10 nm.

According to the photonic theory, photoelectrons are excited and generated under the action of binding energy. Refer to the following energy conservation formulas (1):

$$hv = BE + KE + W$$

$$KE = hv - BE - W$$

$$BE = hv - KE - W \quad (1)$$

BE is photoelectron binding energy; hv is photon energy of X-rays; KE is photoelectron kinetic energy; and W is a work function of a spectrometer.

According to the photonic theory, an excited element and a change of an independent measured element can be determined by the photoelectron energy. Photoelectron intensity is proportional to an atomic number or atomic composition in a film, and the film thickness can be determined thereby.

Figure 4:
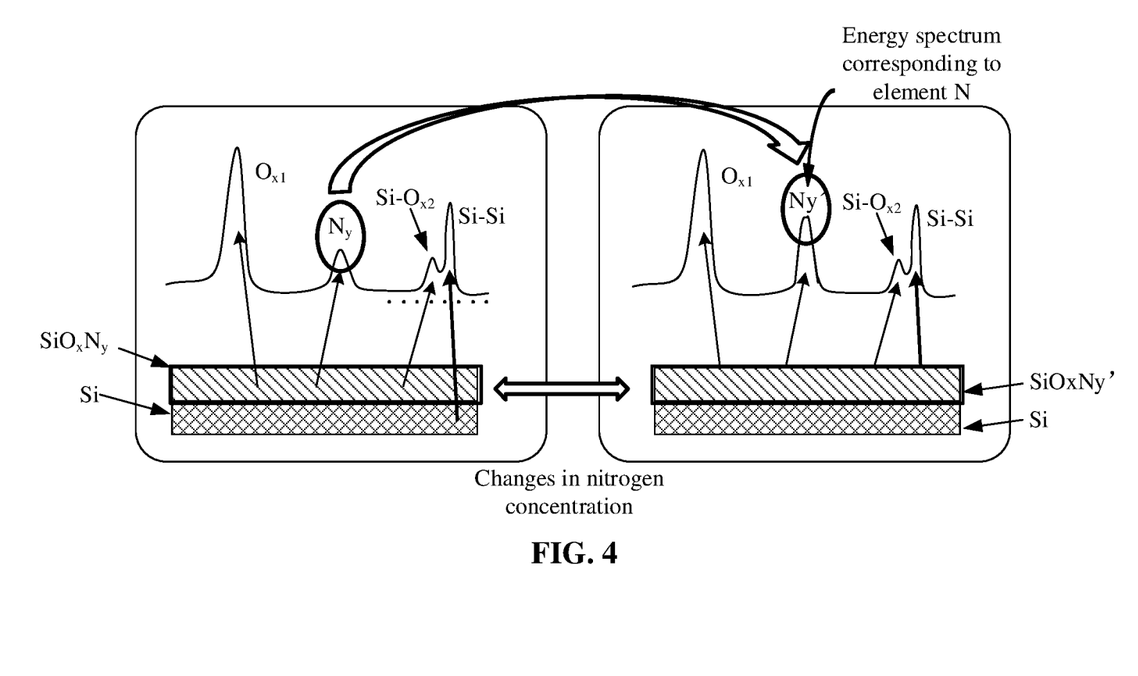
FIG. 4 is a schematic diagram of a change in an energy spectrum excited by photoelectrons along with a change in nitrogen element concentration or a change in a film thickness in embodiments of the disclosure.

As shown in FIG. 4, a change in nitrogen concentration may cause a change in the energy spectrum excited by photoelectrons. For example, the nitrogen concentrations in $SiO_xN_y$ and $SiO_xN_y'$ are different, and thus corresponding nitrogen energy spectra are also different. In addition, the thickness of the silicon oxynitride film will also affect the energy spectrum of each element.

Figure 5:
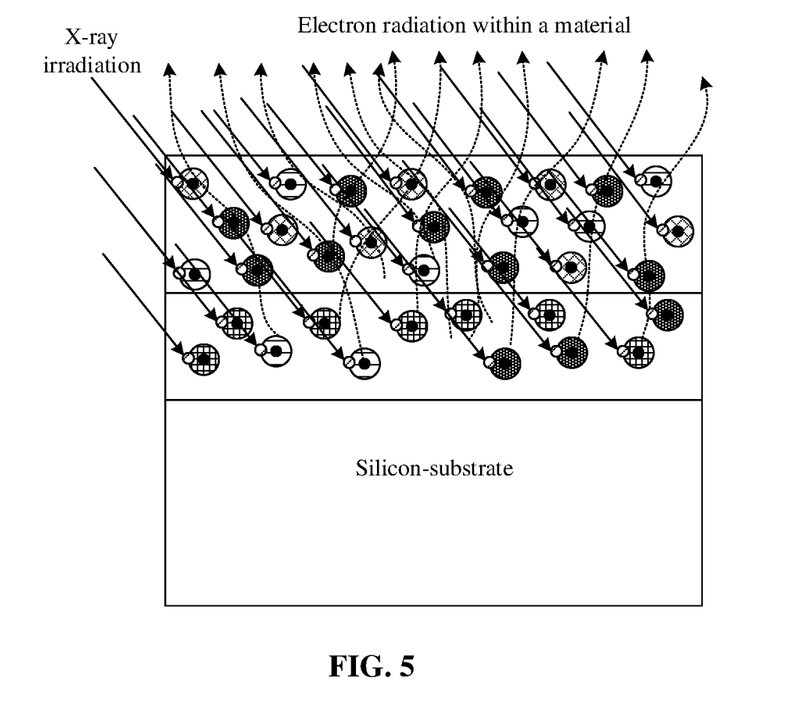
FIG. 5 is a schematic diagram of measurement of nitrogen element concentration using high-energy X-rays in embodiments of the disclosure.

However, the method of measuring nitrogen concentration by high-energy X-rays may cause electron emission inside the material, resulting in a change of material properties, as shown in FIG. 5. Moreover, the intensity of emitted electrons is related to the film thickness and element concentration, especially for ultra-thin film structures.

Figure 6:
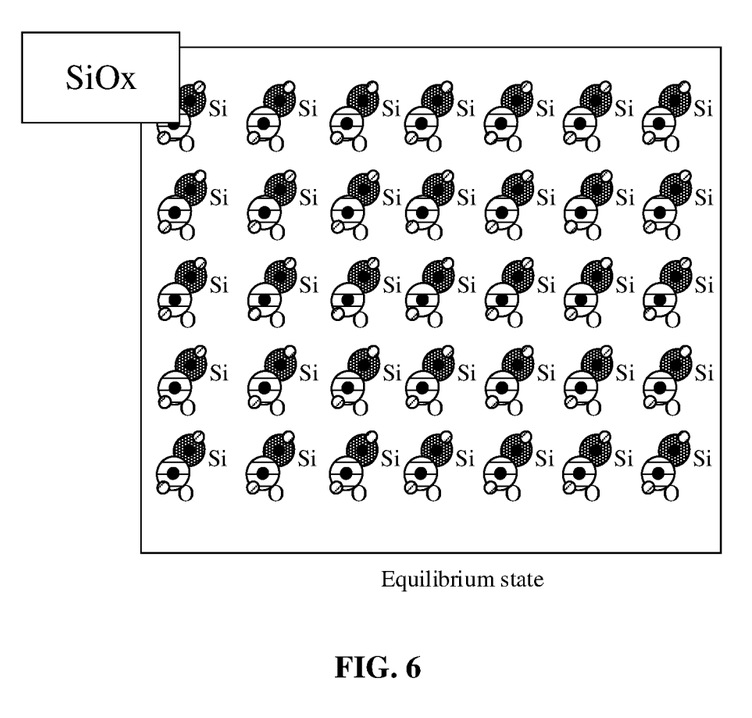
FIG. 6 is a schematic diagram of an equilibrium state of atomic nucleuses and electron clouds in a material in embodiments of the disclosure.
Figure 7:
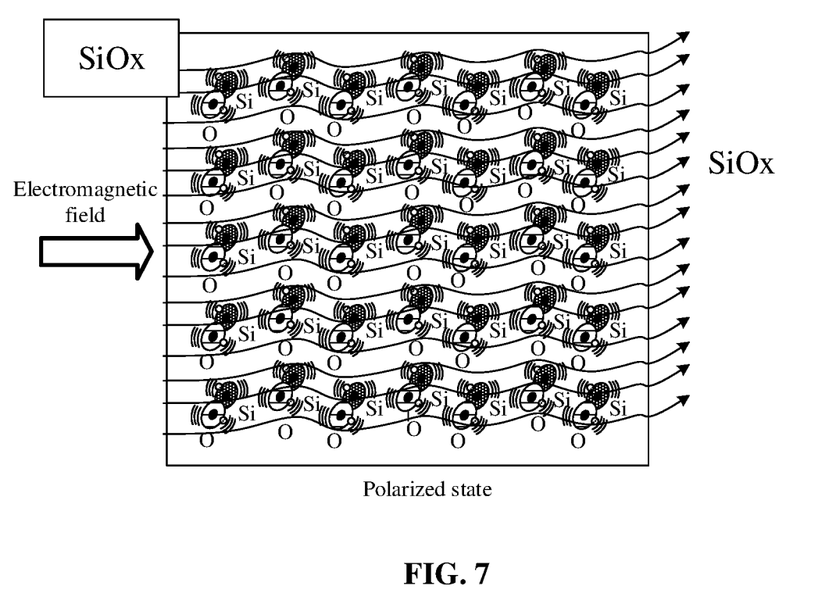
FIG. 7 is a schematic diagram of a polarized state of atomic nucleuses and electron clouds in the material under the action of an electromagnetic field in embodiments of the disclosure.

According to the photonic microwave theory, the nucleuses and the electron clouds are in free space, that is, in an equilibrium state, in the absence of electromagnetic wave irradiation, as shown in FIG. 6. Under the effect of electromagnetic waves, it will change from the equilibrium state to a polarized state, and electromagnetic waves will be radiated. The radiated electromagnetic waves will interfere with original electromagnetic waves, and the interference is related to the material composition, as shown in FIG. 7. Therefore, under the irradiation of electromagnetic waves, the components of the material can be detected by the reflected electromagnetic waves.

Figure 8:
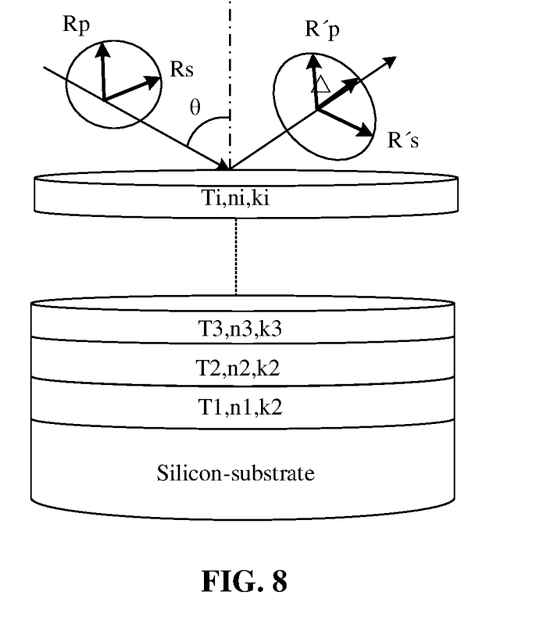
FIG. 8 is a schematic diagram of a principle of elliptically polarized light measurement in embodiments of the disclosure.

In the embodiments of the disclosure, the method of ellipsometry measurement can be used to determine the film thickness, the refractive index, and the absorptivity (T, n, k) of the material. As shown in FIG. 8, when the surface of the material is irradiated with circularly polarized light, the phase difference of the circularly polarized light is Δ=90°, and the intensities of component s (the component that light waves vibrate perpendicular to an incident surface) and component p (the component that the light waves vibrate parallel to the incident surface) of the light waves are identical, i.e., Rs=Rp. The reflected light forms elliptically polarized light under the effect of the material, the phase difference of the elliptically polarized light is Δ≠90°, and the intensities of component s and component p of the light waves are not equal, i.e., Rs≠Rp. According to the following formula (2), the ellipsometry parameters tan ψ and cos Δ can be defined:

$$\frac{Rp}{Rs} = \frac{|Rp|}{|Rs|}e^{i\Delta} = \tan\psi \cos\Delta \quad (2)$$

tan ψ is an intensity ratio of the two components; and Δ is the phase difference of the two components. tan ψ and cos Δ are standard ellipsometry parameters, which depend on film properties (T, n, k) of the sample.

Figure 9:
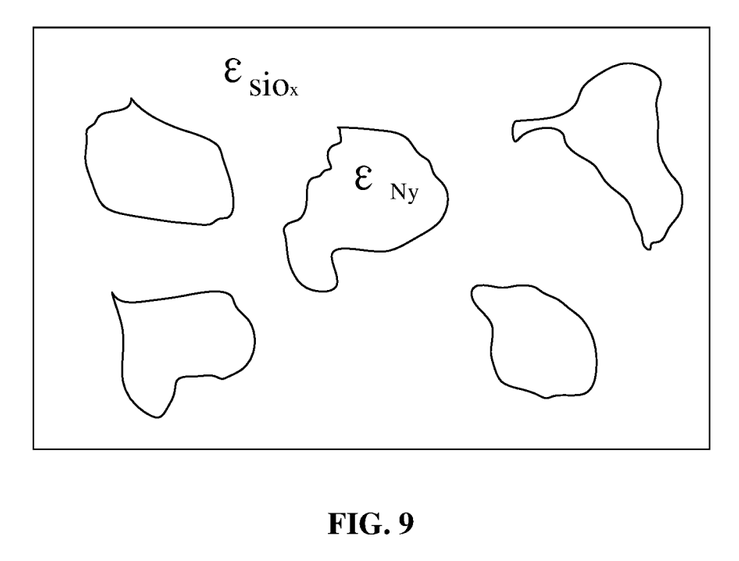
FIG. 9 is a schematic diagram of distribution of dielectric constants of mixture materials in embodiments of the disclosure.

According to the mixed equilibrium effective medium theory, in a mixture formed by mixing nitrogen and silicon oxide and a silicon oxynitride material, as shown in FIG. 9, there is a correspondence between the nitrogen concentration and the dielectric constants of the material as shown below in formula (3):

$$0 = f_{sio_x}\frac{\varepsilon_{sio_x} - \varepsilon}{\varepsilon_{sio_x} + 2\varepsilon} + f_{N_y}\frac{\varepsilon_{N_y} - \varepsilon}{\varepsilon_{N_y} + 2\varepsilon} \quad (3)$$

ε is the dielectric constant of the mixture, $\varepsilon=(n-ik)^2$ is a relationship between the dielectric constant and material property parameters, $\varepsilon_{sio_x}$ is the dielectric constant of silicon oxide in the mixture, and $\varepsilon_{N_y}$ is the dielectric constant of nitrogen in the mixture.

The proportionality coefficients $f_{sio_x}$ and $f_{N_y}$ of the individual substances in the mixture can be determined according to formula (3).

Figure 10:
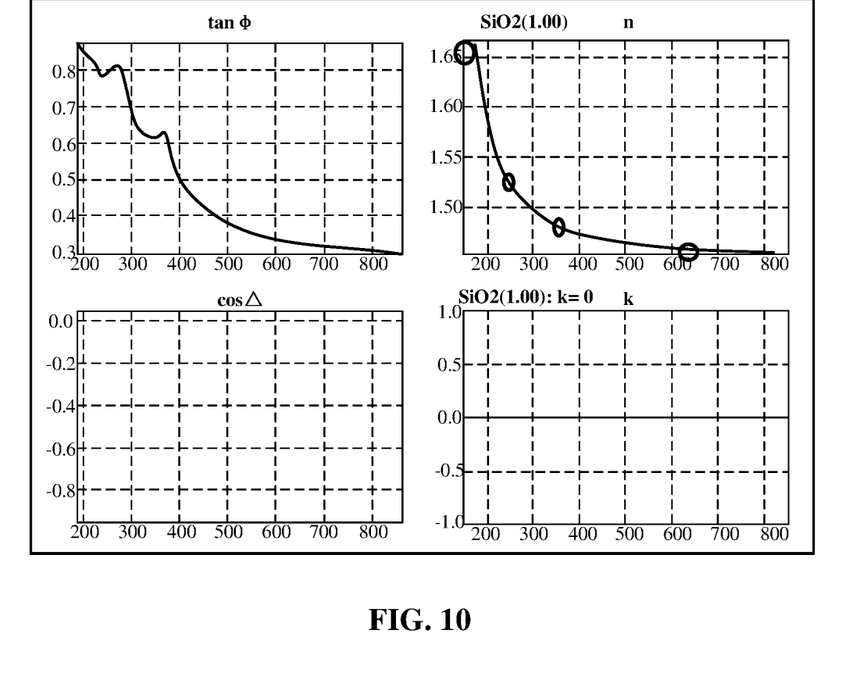
FIG. 10 is a first data chart obtained by a method for measuring an element concentration of a material provided in embodiments of the disclosure.

In the embodiments of the disclosure, various mixing ratios can be used to obtain corresponding n and k by measuring ellipsometry parameters. As shown in FIG. 10, which is a schematic diagram of the corresponding values of individual parameters (tan ψ, cos Δ, n, and k) based on one mixing ratio under the irradiation of electromagnetic waves having different wavelengths. The abscissa in the figure is the wavelength, and the ordinate is the value of each parameter.

Several sets of values in FIG. 10 are shown in Table 1 below.

TABLE 1

Measurement parameters of reference mixture material (Table 1)

| Incident light wavelength (nm) | n | K |
|---|---|---|
| 193 | 1.55877 | 0 |
| 248 | 1.50974 | 0 |
| 356 | 1.47684 | 0 |
| 633 | 1.45786 | 0 |

Figure 11:
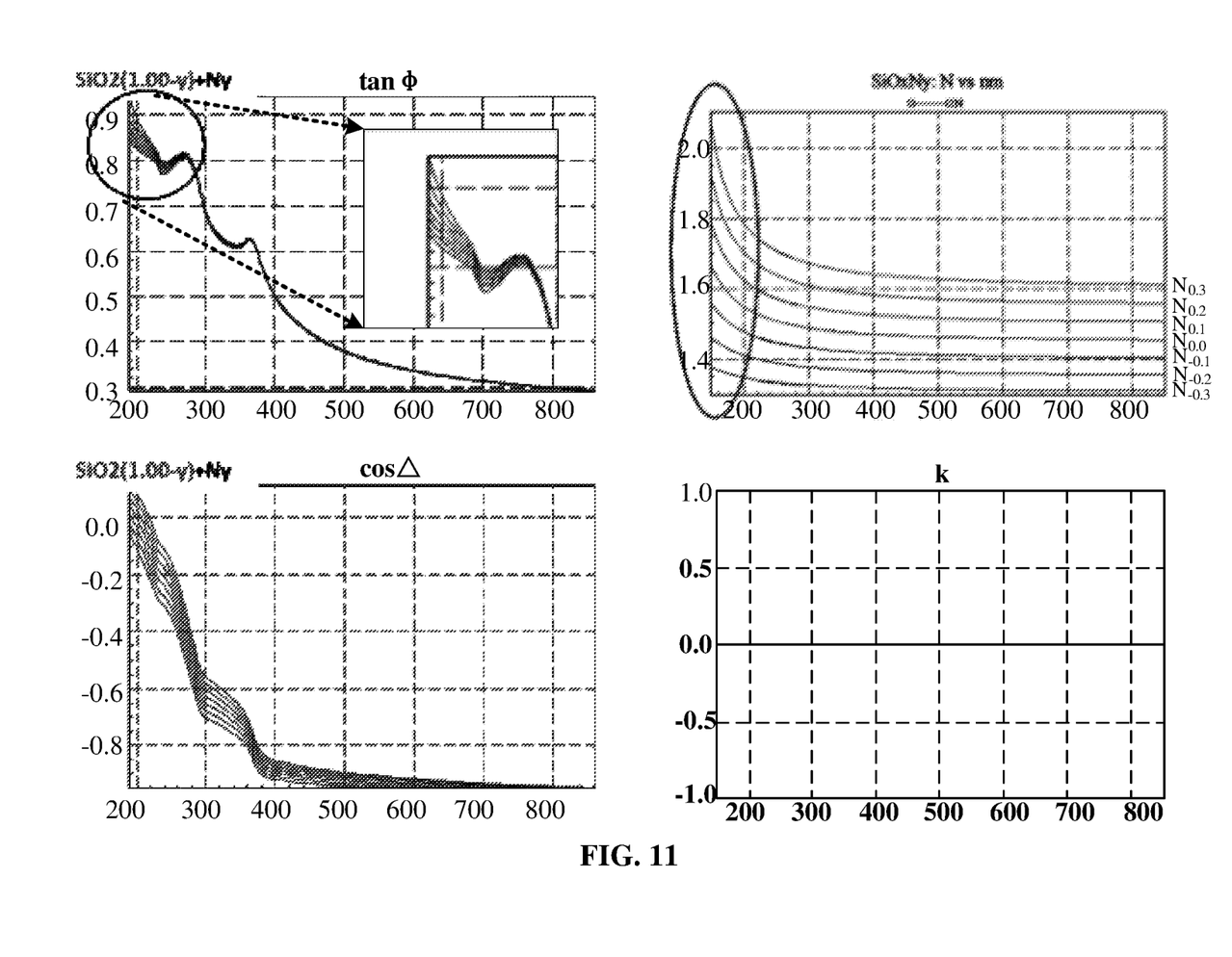
FIG. 11 is a second data chart obtained by a method for measuring an element concentration of a material provided in embodiments of the disclosure.

By increasing or decreasing the content of nitrogen N in the mixture material, several sets of values as shown in FIG. 11 can be obtained. $N_{0.1}$, $N_{0.2}$, and $N_{0.3}$ represent increasing nitrogen by different proportions. $N_{0.0}$ represents the reference mixture material, that is, the mixing ratio of nitrogen is not changed. $N_{-0.1}$, $N_{-0.2}$ and $N_{-0.3}$ represent decreasing nitrogen by different proportions.

It can be seen from FIG. 11 that when the wavelength is in the range of 200-300 nm (i.e., UV light), the ellipsometry parameter tan ψ and refractive index n corresponding to different proportions can be effectively distinguished. Therefore, in practical applications, uv light can be used for the measurement above. According to the proportions of nitrogen in different mixture materials as well as the corresponding ellipsometry parameter tan ψ and refractive index n obtained, a reference function characterizing the reference function relationship between nitrogen and ellipsometry parameter tan ψ or refractive index n can be generated. When the ellipsometry parameter tan ψ or refractive index n of a mixture material having an unknown N concentration is measured, the N concentration in the SiO(1−y)Ny material can be obtained by the reference function calculation.

It should be understood that "one embodiment" or "an embodiment" throughout the description means that a particular feature, structure, or property related to the embodiments is included in at least one embodiment of the disclosure. Thus, "in one embodiment" or "in an embodiment" throughout the description do not necessarily refer to the same embodiment. In addition, the particular features, structures, or properties may be combined in any suitable manner in one or more embodiments. It should be understood that in the embodiments of the disclosure, the serial numbers of the processes do not mean the order of execution. The execution sequence of each process should be determined by its function and internal logic and should not constitute any limitation on the implementation process of the embodiments of the disclosure. The serial numbers of the embodiments of the disclosure are only for description, and do not represent the preference for the embodiments.

It is to be noted that, in the disclosure, the terms "include", "comprise" or any other variations thereof are intended to cover a non-exclusive inclusion, such that a process, method, article, or apparatus including a series of elements not only includes the described elements, but also includes other elements not clearly listed, or further includes elements inherent to the process, method, article, or apparatus. In the absence of more limitations, an element defined by the statement "including a/an . . . " does not exclude that the process, method, article, or apparatus including the element further has other identical elements.

The descriptions above are only implementations of the disclosure. However, the scope of protection of the disclosure is not limited thereto. Any modification or replacement that could be easily conceived by those persons skilled in the art within the technical scope of the disclosure shall fall within the scope of protection of the disclosure. Therefore, the scope of protection of the disclosure shall be subject to the scope of protection of the claims.

In the embodiments of the disclosure, a material sample is irradiated with first electromagnetic waves; corresponding second electromagnetic waves will be radiated by the material sample under the irradiation of the first electromagnetic waves; and material property parameters related to an element concentration of the material sample can be determined by detecting the second electromagnetic waves, such that the element concentration can be determined. Compared with a method of hitting a sample with high-energy rays, irradiating the material sample by electromagnetic waves can reduce changes of material properties, thereby reducing defects in the material caused by measurement carried out on the material.

What is claimed is:

1. A method for measuring an element concentration of a material, comprising:
   irradiating a sample to be measured and one or more reference samples respectively with first electromagnetic waves, wherein the sample to be measured is a compound containing an element to be measured, each reference sample is a mixture of at least two substances, and the at least two substances comprise a substance containing the element to be measured in the sample to be measured;
   obtaining second electromagnetic waves radiated by the sample to be measured and one or more reference samples under the action of the first electromagnetic waves;
   determining material property parameters of the sample to be measured and one or more reference samples by detecting the second electromagnetic waves; and
   determining a reference function according to correspondences between the material property parameters of the one or more reference samples and the element concentrations of the one or more reference samples;
   determining a proportionality coefficient of each substance in each reference sample according to dielectric constants of individual substances in the reference sample and a dielectric constant of the reference sample
   determining an element content of the element to be measured in the compound according to the reference function, the material property parameters of the sample to be measured, and the proportionality coefficient.

2. The method of claim 1, wherein determining the reference function according to the correspondences between the material property parameters of the one or more reference samples and the element concentration of the one or more reference samples comprises:
   determining the reference function according to material property parameters and element concentrations of at least two reference samples, wherein the at least two reference samples have different element concentrations.

3. The method of claim 1, wherein determining the material property parameters of the sample to be measured and one or more reference samples by detecting the second electromagnetic waves comprises:

obtaining wave parameters of the second electromagnetic waves by detecting the second electromagnetic waves; and determining the material property parameters of the sample to be measured and one or more reference samples according to the wave parameters.

4. The method of claim 3, wherein the first electromagnetic waves and the second electromagnetic waves are polarized light, and the wave parameters comprise ellipsometry parameters of the second electromagnetic waves.

5. The method of claim 1, wherein the material property parameters comprise at least one of:
a film thickness;
a refractive index; or
an absorptivity.

6. The method of claim 1, wherein the sample to be measured and one or more reference samples at least comprises:
oxygen, silicon, and nitrogen.

7. A method for measuring an element concentration of a material, comprising:

irradiating one or more reference samples with first electromagnetic waves, wherein each reference sample is a mixture of at least two substances, and the at least two substances comprise a substance containing an element to be measured, wherein the first electromagnetic waves comprise: at least two groups of electromagnetic waves having different wavelengths;

obtaining second electromagnetic waves radiated by the one or more reference samples under the action of the first electromagnetic waves;

determining material property parameters of the one or more reference samples by detecting the second electromagnetic waves; and determining a reference function according to correspondences between the material property parameters and element concentrations of the one or more reference samples, wherein the element concentration is concentration of the element to be measured in each reference sample, and the reference function is used for determining the element concentration of the element to be measured in a sample to be measured;

wherein determining the reference function according to correspondences between the material property parameters and the element concentration of the one or more reference samples comprises:

determining at least two relationship curves according to the material property parameters respectively obtained according to the at least two groups of electromagnetic waves having different wavelengths and corresponding element concentrations; and determining a relationship curve with a largest change rate among the at least two relationship curves as the reference function.

8. The method of claim 7, wherein determining material property parameters of the one or more reference samples by detecting the second electromagnetic waves comprises:

obtaining wave parameters of the second electromagnetic waves by detecting the second electromagnetic waves; and determining the material property parameters of each reference sample according to the wave parameters.

9. The method of claim 8, wherein the first electromagnetic waves and the second electromagnetic waves are polarized light, and the wave parameters comprise ellipsometry parameters of the second electromagnetic waves.

10. The method of claim 7, wherein the material property parameters comprise at least one of:
a film thickness;
a refractive index; or
an absorptivity.

* * * * *